G. S. WINSLOW.
Gaskets for Car Axle-Boxes.
No. 199,390. Patented Jan. 22, 1878.
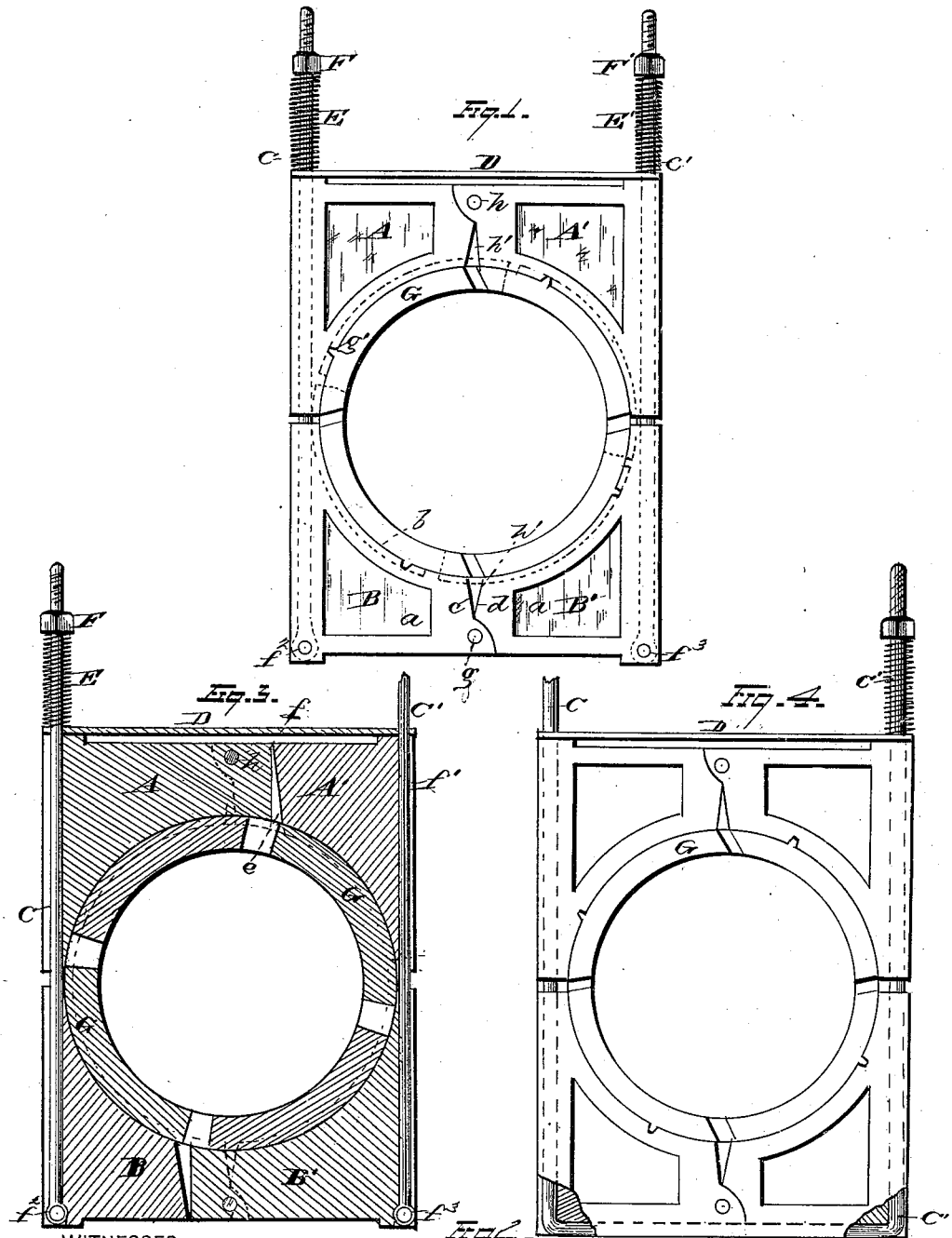

UNITED STATES PATENT OFFICE.

GEORGE S. WINSLOW, OF CEDAR RAPIDS, IOWA.

IMPROVEMENT IN GASKETS FOR CAR-AXLE BOXES.

Specification forming part of Letters Patent No. 199,390, dated January 22, 1878; application filed August 20, 1877.

*To all whom it may concern:*

Be it known that I, GEORGE S. WINSLOW, of Cedar Rapids, in the county of Linn and State of Iowa, have invented certain new and useful Improvements in Gaskets for Car-Axle Boxes; and I do hereby declare the following to be a full, clear, and exact description of the invention, such as will enable others skilled in the art to which it pertains to make and use it, reference being had to the accompanying drawings, which form part of this specification.

My invention relates to an improved gasket for car-axle boxes, the object of the same being, first, to provide a gasket of such form and construction that it may be secured around the axle-journal within the rear portion of the oil-box or housing, and be adapted to be readily adjusted to compensate for wear, and thus always be made to snugly fit the axle-journal and exclude dust from the bearings, and also prevent the escape of lubricant from the oil-box.

My invention further consists in the combination, with the hinged sections of a gasket, of a sectional detachable bushing.

In the accompanying drawings, Figure 1 represents a plan view of my invention. Fig. 2 is a top view, and Fig. 3 is a vertical section, of the same. Fig. 4 shows a modification of my manner of engaging the gasket with the adjusting-rods.

A A' represent the upper, and B B' the lower, sections of the gasket, which parts are made of any material desired, though cast-iron may be employed to advantage, as the parts can be made sufficiently light by forming the body $a$ of the several sections of a thin plate, while the edges $b$ of the same may be reenforced to constitute bearings of sufficient thickness for the purposes in view.

The opposing edges $c$ $d$ of the independent sections composing the gasket are formed with mortises $e$ and tenons $f$, so that the several parts, when first applied, may fit into each other, and constitute a continuous close fitting bearing around the axles, and serve to effectually exclude all dust from the bearings, and also prevent the escape of oil from the box. The outer sides of each section are provided with mortises $f^1$, in order to allow for the attachment of adjusting-rods C C', which latter are pivoted or hinged to the lower sections B B' at $f^2$ $f^3$. The lower sections B B' of the gasket are hinged together at $g$, and the upper sections at $h$.

D represents a cross-bar, perforated at its ends for the passage of the upper and screw-threaded ends of the adjusting-rods C C'.

The tension of the springs E E' is regulated by the nuts F F' turned down upon them. The gasket is placed around the axle-journal in the rear portion of the oil-box or housing, and when in position the cross-bar is above the upper surface of the housing, and hence the tension of the springs can be readily ascertained. When the gasket is first applied the cross-bar will be situated nearly at the upper ends of the screw-threaded adjusting-rods; but after the gasket has been subjected to wear, it will be found that there is little tension on the spiral springs, and hence the adjusting or regulating nuts are turned down, which operation serves to force the upper sections A A' of the gasket firmly against the axle-journal, and also to draw the lower sections B B' upwardly against the lower surface of the journal.

Gaskets for axle-boxes have heretofore been made where the upper and lower portions of the gasket may be forced against the journal; but in many such cases, after the gasket has become worn, no provision is made for forcing the sections of the gasket against the sides as well as the upper and lower portions of the journal; and this is accomplished in my improved gasket as follows:

The several sections of the gasket are formed with one of their meeting-edges inclined, as shown at $h'$ in order that they may be partly rotated, and thus have both vertical and lateral movement while being adjusted for wear.

It will be noticed that when the nuts are turned downward on the adjusting-rods it has the effect of shortening said rods, and, as the rods are pivoted or hinged to sections B B', the rods, when shortened to take up for wear, impart both a vertical and lateral movement to each one of the sections of the gasket, and thus effectually preserve a complete and continuous bearing around the journal.

The condition of the gasket may be readily determined by inspecting the spiral springs, and, if the sections are worn so that little tension is exerted on the same, it will indicate the fact of undue wear on the gasket, and by simply turning down the nuts the several sections of the gasket are quickly forced against the journal, and constitute a continuous close bearing or sleeve around the same.

The feature of securing a perfect-fitting gasket under various stages of wear is one of great value and importance, as a slight opening at the sides of the gasket will allow oil to escape, and also dust to enter and cut away the brasses, which trouble is effectually avoided by my improved gasket.

The bushing G is made in four sections, which are secured together by mortise-and-tenon joint similar to that of the gasket-sections. The outer periphery of this bushing is formed with an annular tongue or rib, $g$, locking into a corresponding circular groove in the interior face of the gasket, which prevents lateral displacement and securely engages the bushing and gasket, with the aid of the transverse ribs $g'$, projecting right-angularly to the main circular rib $g$.

Each of the sections of the bushing is provided with these two locking mechanisms, and while the small cross-rib serves to prevent displacement in a vertical plane, or one parallel with the greater dimension of the gasket, it also locks the bushing from partaking of the rotary movement of the axle, and maintains it fixed with the gasket. As the wear is taken up by the sectional bushing, the frictional bearing of the axle falls alone upon the same, and the result is that the gasket is protected from all wear of this nature; and upon the bushing becoming worn out, it is easily removed and a new one put in its place.

I have thus far represented the gasket and detachable ring-bearing as operating together; but my invention is not so limited, nor is it dependent upon the combination of the two. The bushing may be omitted entirely, the inner face of the gasket made smooth instead of channeled, and the gasket be directly applied to the car-axle.

This will give a plane wearing-face for the gasket to receive the immediate action or frictional wear of the axle; and all the advantages heretofore set forth as resulting from the construction of the gasket, aside from the detachable bushing, will apply to it when operating independently of the latter. In other words, the bushing used in connection with the gasket is my preferred way of providing an axle-box; but the bushing may be, in fact, used or omitted, and not affect my invention in the gasket alone.

In Fig. 4 of the drawings I have shown the adjustable rods C C' in a modified manner of connection with the lower sections of the gasket, according to which the slots and rivet mechanism is omitted, and the rods are made in a single piece, which passes about the lower horizontal edge of the gasket, seating in a groove formed entirely around the bottom and sides of the same, and operating as one part. This style of construction may be used in substitution for that shown in the other figures of the drawing, and described in the foregoing; and I desire to be understood as including both forms of construction in my invention, either of which may be used, as is most preferable.

Having fully described my invention, what I claim as new, and desire to secure by Letters Patent, is—

1. A gasket for oil-boxes consisting of sections hinged or pivoted to each other, substantially as and for the purpose set forth.

2. The sections of a gasket for oil-boxes, consisting of hinged or pivoted sections, said sections being cut away at their meeting or joining edges, substantially as and for the purpose set forth.

3. The sections of a gasket each of which are formed with a mortised and tenoned edge, said sections arranged in pairs above and below the journal, and the pairs hinged or pivoted to each other, substantially as and for the purpose set forth.

4. The combination, with the hinged sections of a gasket, of an adjusting-rod engaging with the lower sections of the gasket, substantially as and for the purpose set forth.

5. The combination, with the hinged sections forming a gasket, of adjusting-rods, connecting in any suitable way with the lower sections, a cross-bar, spiral springs, and adjusting-nuts, substantially as and for the purpose set forth.

6. A gasket consisting of hinged sections, having a groove formed in their sides or sides and bottom, in combination with adjusting-rods located in said grooves, and operating the hinged sections, substantially as and for the purpose set forth.

7. The combination, with the hinged sections of a gasket, of a sectional removable bushing, substantially as described.

8. The combination, with a gasket having a circular and transverse locking-grooves on its inner face, of the detachable wearing-bushing, having an annular rib and short right-angular projections formed on its corresponding or adjoining face, substantially as and for the purpose set forth.

In testimony that I claim the foregoing I have hereunto set my hand this 16th day of June, 1877.

GEORGE S. WINSLOW.

Witnesses:
R. W. BUSHNELL,
W. P. CLARK.